United States Patent
Chen et al.

(10) Patent No.: US 9,792,562 B1
(45) Date of Patent: Oct. 17, 2017

(54) EVENT PREDICTION AND OBJECT RECOGNITION SYSTEM

(71) Applicant: SAS Institute Inc., Cary, NC (US)

(72) Inventors: Xu Chen, Apex, NC (US); Tao Wang, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/335,530

(22) Filed: Oct. 27, 2016

Related U.S. Application Data (60) Provisional application No. 62/325,668, filed on Apr. 21, 2016.

(51) Int. Cl.
*G06N 99/00* (2010.01)
*G06N 5/00* (2006.01)
*G06N 7/00* (2006.01)

(52) U.S. Cl.
CPC ........... *G06N 99/005* (2013.01); *G06N 5/003* (2013.01); *G06N 7/005* (2013.01)

(58) Field of Classification Search
CPC .................................................. G06N 5/003
USPC ........................................................ 706/46
See application file for complete search history.

(56) References Cited

PUBLICATIONS

Zhou et al ("Learning with Local and Global Consistency" 2004).*
Zhang et al ("Prototype Vector Machine for Large Scale Semi-Supervised Learning" 2009).*
Kawano et al ("Semi-Supervised Logistic Discrimination via Graph-Based Regularization" May 29, 2012).*
Zhu et al ("Combining Active Learning and Semi-Supervised Learning Using Gaussian Fields and Harmonic Functions" 2003).*
1.14. SemiSupervised—scikit-learn 0.17.1 documentation, Apr. 27, 2016, pp. 1-2.
Scikit-learn: machine learning in Python—scikit-learn 0.17.1 documentation, Apr. 27, 2016, pp. 1-3.
S. Baluja ,Probabilistic modeling for face orientation discrimination: Learning from labeled and unlabeled data, Neural Information Processing Systems, 1998.
Bennett et al., Semi-supervised support vector machines, Advances in Neural Information Processing Systems, 1998, pp. 368-374.
Blum et al., Combining Labeled and Unlabeled Data with Co-Training, COLT, 1998.

(Continued)

*Primary Examiner* — Lut Wong
(74) *Attorney, Agent, or Firm* — Bell & Manning, LLC (57) ABSTRACT

A computing device predicts occurrence of an event or classifies an object using semi-supervised data. A label set defines permissible values for a target variable. A value of the permissible values is defined for a subset of observation vectors. A predefined number of times, a distance matrix is computed that defines a distance value between pairs of observation vectors using a distance function and a converged classification matrix; a number of observation vectors is selected that have minimum values for the distance value; a label is requested and a response is received for each of the selected observation vectors; the value of the target variable is updated for each of the selected observation vectors with the received response; and the value of the target variable is determined again by recomputing the converged classification matrix. The value of the target variable for each observation vector is output to a second dataset.

15 Claims, 5 Drawing Sheets

(56) References Cited

PUBLICATIONS

Castelli et al., On the exponential value of labeled samples, Pattern Recognition Letters 16, Jan. 1995, pp. 105-111.

Cozman et al., Semi-Supervised Learning of Mixture Models, Proceedings of the Twentieth International Conference on Machine Learning (ICML-2003), Washington DC, 2003.

Fergus et al., Semi-supervised Learning in Gigantic Image Collections, Advances in Neural Information Processing Systems, Jan. 2009.

Kullback et al., On Information and Sufficiency, Annals of Mathematical Statistics 22 (1), 1951, pp. 79-86.

T. Mitchell, The Role of Unlabeled Data in Supervised Learning, In Proceedings of the Sixth International Colloquium on Cognitive Science, San Sebastian, Spain, May 1999.

Nigam et al., Text Classification from Labeled and Unlabeled Documents using EM, Machine Learning 39, May 2000, pp. 103-134.

Pitelis et al., Semi-Supervised Learning Using an Unsupervised Atlas, Proceedings of the European Conference on Machine Learning , Sep. 2014, pp. 565-580.

Ranzato et al., Semi-supervised Learning of Compact Document Representations with Deep Networks, Proceedings of the 25 th International Conference on Machine Learning, Helsinki, Finland, 2008.

Rifai et al., The Manifold Tangent Classifier, Advances in Neural Information Processing Systems, 2011.

Riloff et al., Learning Subjective Nouns using Extraction Pattern Bootstrapping, Proceedings of the Seventh Conference on Natural Language Learning, 2003.

Rosenberg et al., Semi-Supervised Self-Training of Object Detection Models, Seventh IEEE Workshop on Applications of Computer Vision, Jan. 2005.

Vapnik, SV Machines for Pattern Recognition, Chapter 12 in Statistical Learning Theory, Wiley-Interscience, Sep. 1998.

Weston, Deep Learning via Semi-Supervised Embedding, Proceedings of the 25th International Conference on Machine Learning, Helsinki, Finland, 2008.

D. Yarowsky, Unsupervised word sense disambiguation rivaling supervised methods, Proceedings of the 33rd Annual Meeting of the Association for Computational Linguistics, 1995, pp. 189-196.

Zhou et al., Learning with Local and Global Consistency, Advances in Neural Information Processing Systems, 2004.

X. Zhu, Semi-Supervised Learning Literature Survey, Computer Sciences TR 1530, University of Wisconsin—Madison, 2005.

Fung et al., Semi-supervised support vector machines for unlabeled data classification, Optimization Methods and Software, 2001.

Mahapatra et al., Semi-Supervised and Active Learning for Automatic Segmentation of Crohn's Disease, Medical Image Computing and Computer-Assisted Intervention (MICCAI), 2013, pp. 214-221.

Mahapatra et al., Combining Multiple Expert Annotations Using Semi-Supervised Learning and Graph Cuts for Crohn's Disease Segmentation, Medical Image Computing and Computer-Assisted Intervention, 2014.

Badrinarayanan et al., Semi-Supervised Video Segmentation Using Tree Structured Graphical Models, IEEE Transactions on Pattern Analysis and Machine Intelligence, vol. 35, No. 11, 2013.

Su et al., Interactive Cell Segmentation based on Active and Semi-supervised Learning, IEEE Transactions on Medical Imaging, vol. 35, Issue 3, Mar. 2016.

Onofrey et al., Low-Dimensional Non-Rigid Image Registration Using Statistical Deformation Models From Semi-Supervised Training Data, IEEE Transactions on Medical Imaging, Feb. 16, 2015.

Meier et al., Patient-Specific Semi-Supervised Learning for Postoperative Brain Tumor Segmentation, Medical Image Computing and Computer-Assisted Intervention MICCAI, 2014, pp. 714-721.

Turian et al., Word representations: A simple and general method for semi-supervised learning , ACL Proceedings of the 48th Annual Meeting of the Association for Computational Linguistics, Jul. 2010, pp. 384-394.

Tur et al., Combining active and semi-supervised learning for spoken language understanding, Speech Communications 45, 2005, pp. 171-186.

* cited by examiner

EVENT PREDICTION AND OBJECT RECOGNITION SYSTEM

CROSS-REFERENCE TO RELATED APPLICATIONS

The present application claims the benefit of 35 U.S.C. §119(e) to U.S. Provisional Patent Application No. 62/325,668 filed on Apr. 21, 2016, the entire contents of which is hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label, target variable y, in training data by defining a model that describes the hidden structure in the training data. Supervised learning requires that the target (dependent) variable y be labeled in training data so that a model can be built to predict the label of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

SUMMARY

In an example embodiment, a non-transitory computer-readable medium is provided having stored thereon computer-readable instructions that, when executed by a computing device, cause the computing device to predict occurrence of an event or to classify an object using semi-supervised data to label unlabeled data in a dataset. A dataset is read that includes a plurality of observation vectors. A label set is read that defines permissible values for a target variable. A value of the permissible values of the target variable is defined for a subset of the plurality of observation vectors. (a) A classification matrix is initialized based on the value of the target variable of each observation vector of the plurality of observation vectors; (b) a converged classification matrix is computed, wherein the converged classification matrix defines a label probability for each permissible value defined in the label set for each observation vector of the plurality of observation vectors; and (c) for each observation vector, the value of the target variable is updated based on a maximum label probability value identified from the converged classification matrix. A predefined number of times, a distance matrix is computed that defines a distance value between each pair of the plurality of observation vectors using a distance function and the converged classification matrix; a number of observation vectors is selected from the dataset that have minimum values for the distance value; a label is requested for each of the selected observation vectors; a response to the request is received for each of the selected observation vectors; the value of the target variable is updated for each of the selected observation vectors with the received response; and operations (a) to (c) are repeated. After the predefined number of times, the value of the target variable for each observation vector of the plurality of observation vectors is output to a second dataset.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unlabeled data in a dataset.

In an example embodiment, a method of predicting occurrence of an event or classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
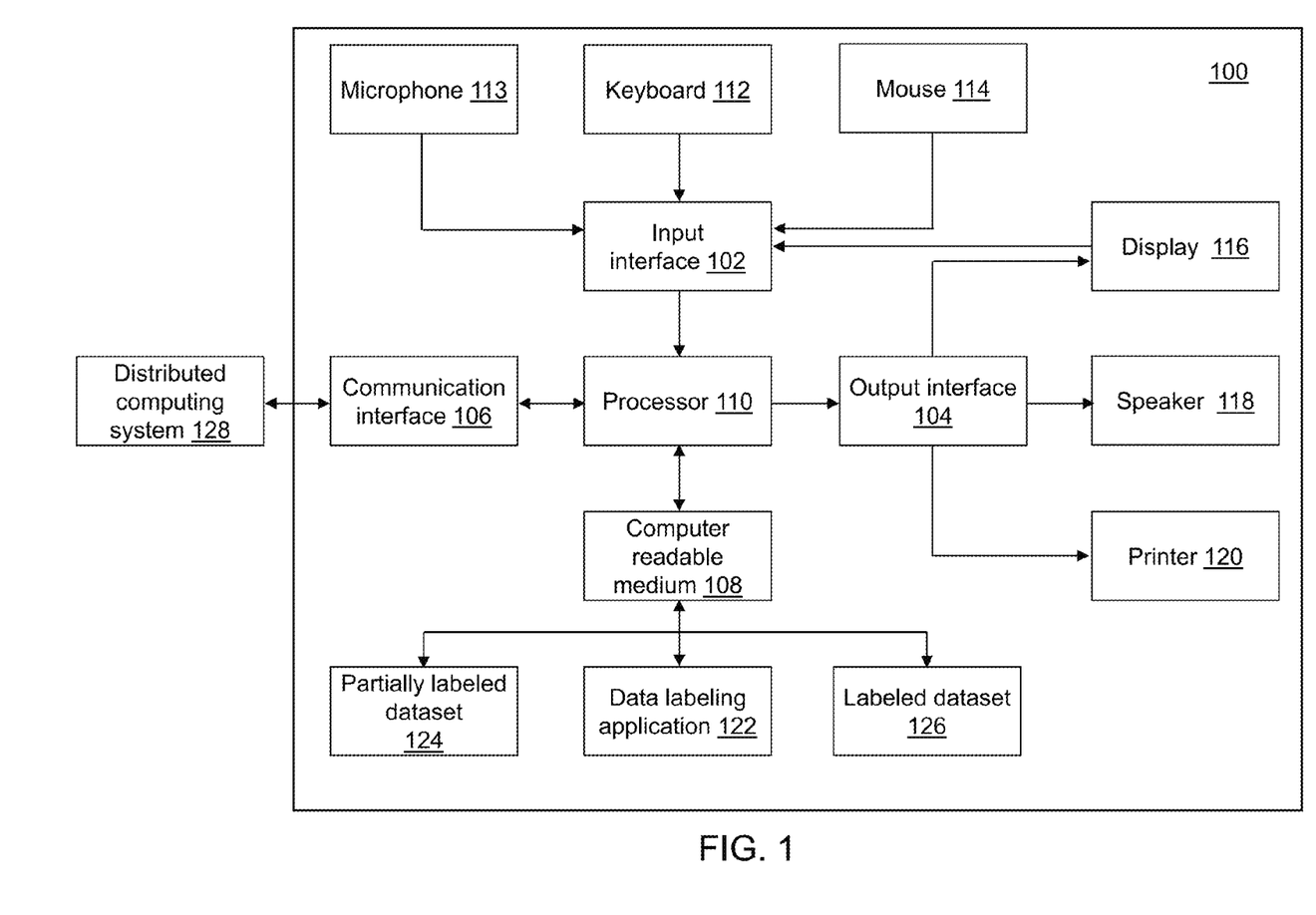
FIG. 1 depicts a block diagram of a data labeling device in accordance with an illustrative embodiment.

Referring to FIG. 1, a block diagram of a data labeling device 100 is shown in accordance with an illustrative embodiment. Data labeling device 100 may include an input interface 102, an output interface 104, a communication interface 106, a non-transitory computer-readable medium 108, a processor 110, a data labeling application 122, a partially labeled dataset 124, and a labeled dataset 126. Fewer, different, and/or additional components may be incorporated into data labeling device 100.

Input interface 102 provides an interface for receiving information from the user or another device for entry into data labeling device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into data labeling device 100 or to make selections presented in a user interface displayed on display 116. The same interface may support both input interface 102 and output interface 104. For example, display 116 comprising a touch screen provides a mechanism for user input and for presentation of output to the user. Data labeling device 100 may have one or more input interfaces that use the same or a different input interface technology. The input interface technology further may be accessible by data labeling device 100 through communication interface 106.

Output interface 104 provides an interface for outputting information for review by a user of data labeling device 100 and/or for use by another application or device. For example, output interface 104 may interface with various output technologies including, but not limited to, display 116, a speaker 118, a printer 120, etc. Data labeling device 100 may have one or more output interfaces that use the same or a different output interface technology. The output interface technology further may be accessible by data labeling device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data labeling device 100 may have one or more communication interfaces that use the same or a different communication interface technology. For example, data labeling device 100 may support communication using an Ethernet port, a Bluetooth antenna, a telephone jack, a USB port, etc. Data and messages may be transferred between data labeling device 100 and distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data labeling device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data labeling device 100 also may have one or more drives that support the loading of a memory media such as a CD, DVD, an external hard drive, etc. One or more external hard drives further may be connected to data labeling device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data labeling device 100 may include a plurality of processors that use the same or a different processing technology.

Data labeling application 122 performs operations associated with defining labeled dataset 126 from data stored in partially labeled dataset 124. Some or all of the operations described herein may be embodied in data labeling application 122.

Referring to the example embodiment of FIG. 1, data labeling application 122 is implemented in software (comprised of computer-readable and/or computer-executable instructions) stored in computer-readable medium 108 and accessible by processor 110 for execution of the instructions that embody the operations of data labeling application 122. Data labeling application 122 may be written using one or more programming languages, assembly languages, scripting languages, etc. Data labeling application 122 may be integrated with other analytic tools. For example, data labeling application 122 may be part of SAS® Enterprise Miner™ developed and provided by SAS Institute Inc. of Cary, N.C. that may be used to create highly accurate predictive and descriptive models based on analysis of vast amounts of data from across an enterprise. Data labeling application 122 further may be part of SAS® Enterprise Guide, SAS® Visual Analytics, SAS® LASR™ Analytic Server, and/or SAS® Access Engine(s) also developed and provided by SAS Institute Inc. of Cary, N.C., USA.

Data labeling application 122 is applicable in a variety of industries. For example, data labeling application 122 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Data labeling application 122 may be integrated with other data processing tools to automatically process data generated as part of operation of an enterprise, facility, system, device, etc., to label the data, and to provide a warning or alert associated with the labeling using input interface 102, output interface 104, and/or communication interface 106 so that appropriate action can be initiated in response to the labeling. For example, medical images that include a tumor may be recognized by data labeling application 122 which triggers a notification message sent to a clinician that a tumor has been identified based on a "tumor" label determined for the image data.

Data labeling application 122 may be implemented as a Web application. For example, data labeling application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Partially labeled dataset 124 may include, for example, a plurality of rows and a plurality of columns. The plurality of rows may be referred to as observation vectors or records, and the columns may be referred to as variables. Partially labeled dataset 124 may be transposed. An observation vector $x_i$ may include a value for each of the plurality of variables associated with the observation i. Each variable of the plurality of variables describes a characteristic of a physical object, such as a living thing, a vehicle, terrain, a computing device, a physical environment, etc. For example, if partially labeled dataset 124 includes data related to operation of a vehicle, the variables may include an oil pressure, a speed, a gear indicator, a gas tank level, a tire pressure for each tire, an engine temperature, a radiator level, etc. Partially labeled dataset 124 may include data captured as a function of time for one or more physical objects.

Partially labeled dataset 124 includes supervised data and unsupervised data. The supervised data includes a $y_i$-variable (target) value that indicates a truth related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, partially labeled dataset 124 may include image data captured by medical imaging equipment (i.e., computed tomography image, magnetic resonance image, x-ray image, ultrasound image, etc.) of a body part of a living thing. A subset of the image data is labeled, for example, as either indicating existence of a medical condition or non-existence of the medical condition. Partially labeled dataset 124 may include a reference to image data that may be stored, for example, in an image file, and the existence/non-existence label associated with each image file. Partially labeled dataset 124 includes a plurality of such references. The existence/non-existence labels may be defined by a clinician or expert in the field to which data stored in partially labeled dataset 124 relates.

The data stored in partially labeled dataset 124 may be generated by and/or captured from a variety of sources including one or more sensors of the same or different type, one or more computing devices, etc. The data stored in partially labeled dataset 124 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Partially labeled dataset 124 may be stored on computer-readable medium 108 or on one or more computer-readable media of distributed computing system 128 and accessed by data labeling device 100 using communication interface 106, input interface 102, and/or output interface 104. Data stored in partially labeled dataset 124 may be sensor measurements or signal values captured by a sensor, may be generated or captured in response to occurrence of an event or a transaction, generated by a device such as in response to an interaction by a user with the device, etc. The data stored in partially labeled dataset 124 may be captured at different date/time points periodically, intermittently, when an event occurs, etc. Each record of partially labeled dataset 124 may include one or more date values and/or time values.

Partially labeled dataset 124 may include data captured at a high data rate such as 200 or more observations per second for one or more physical objects. For example, data stored in partially labeled dataset 124 may be generated as part of the Internet of Things (IoT), where things (e.g., machines, devices, phones, sensors) can be connected to networks and the data from these things collected and processed within the things and/or external to the things before being stored in partially labeled dataset 124. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in partially labeled dataset 124.

Partially labeled dataset 124 may be stored using one or more of various structures as known to those skilled in the art including one or more files of a file system, a relational database, one or more tables of a system of tables, a structured query language database, etc. on data labeling device 100 or on distributed computing system 128. Data labeling device 100 may coordinate access to partially labeled dataset 124 that is distributed across distributed computing system 128 that may include one or more computing devices that can communicate using a network. For example, partially labeled dataset 124 may be stored in a cube distributed across a grid of computers as understood by a person of skill in the art. As another example, partially labeled dataset 124 may be stored in a multi-node Hadoop® cluster. For instance, Apache™ Hadoop® is an open-source software framework for distributed computing supported by the Apache Software Foundation. As another example, partially labeled dataset 124 may be stored in a cloud of computers and accessed using cloud computing technologies, as understood by a person of skill in the art. The SAS® LASR™ Analytic Server may be used as an analytic platform to enable multiple users to concurrently access data stored in partially labeled dataset 124. The SAS® Viya™ open, cloud-ready, in-memory architecture also may be used as an analytic platform to enable multiple users to concurrently access data stored in partially labeled dataset 124. Some systems may use SAS In-Memory Statistics for Hadoop® to read big data once and analyze it several times by persisting it in-memory for the entire session. Some systems may be of other types and configurations.

Labeled dataset 126 may be identical to partially labeled dataset 124 except that labeled dataset 126 includes only supervised data such that the $y_i$-variable (target) value of each observation vector $x_i$ is labeled. For example, in the medical imaging example, the existence or non-existence label is associated with each image file.

Figure 2A:
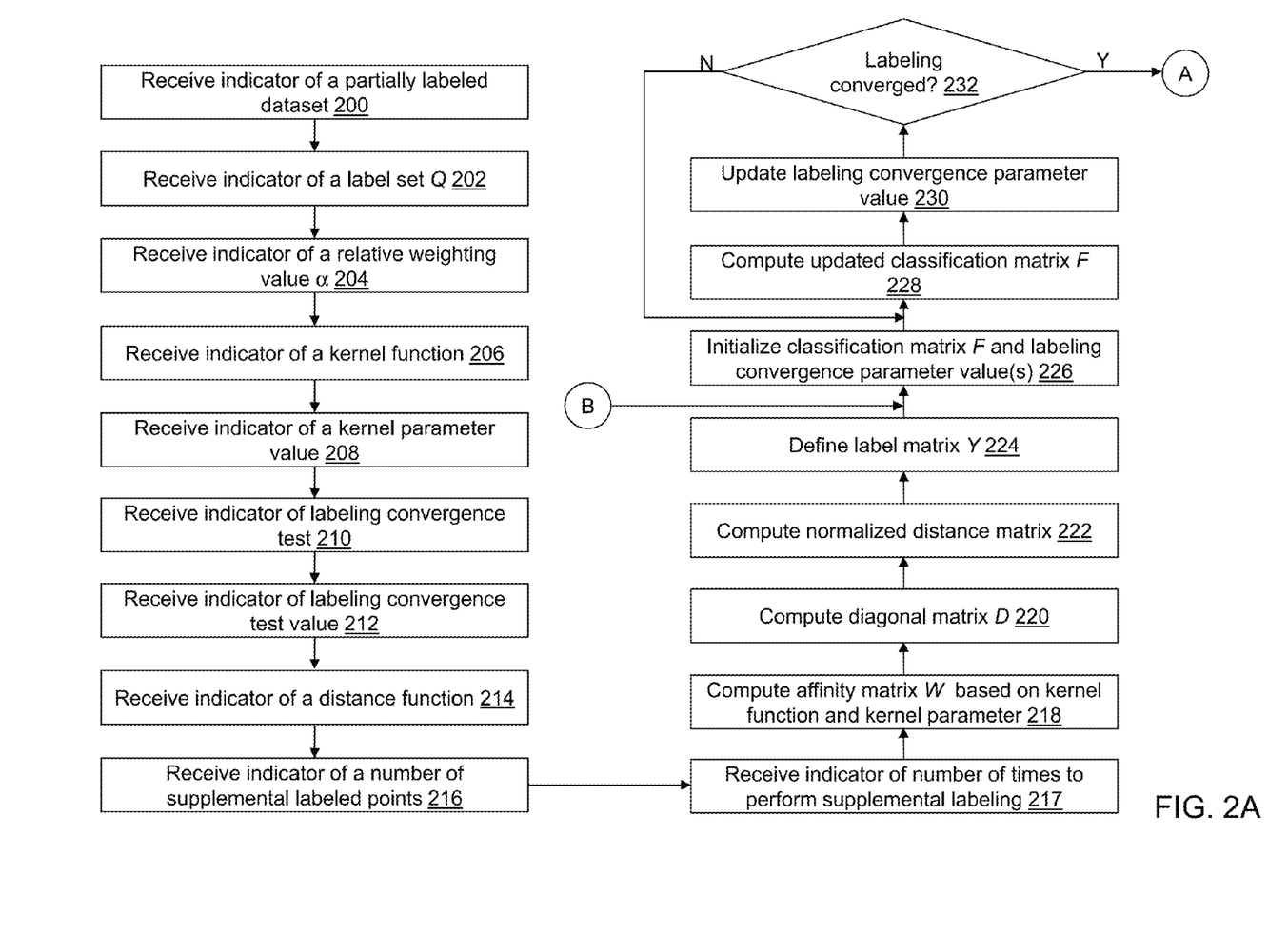
FIGS. 2A and 2B depict a flow diagram illustrating examples of operations performed by the data labeling device of FIG. 1 in accordance with an illustrative embodiment.
Figure 2B:
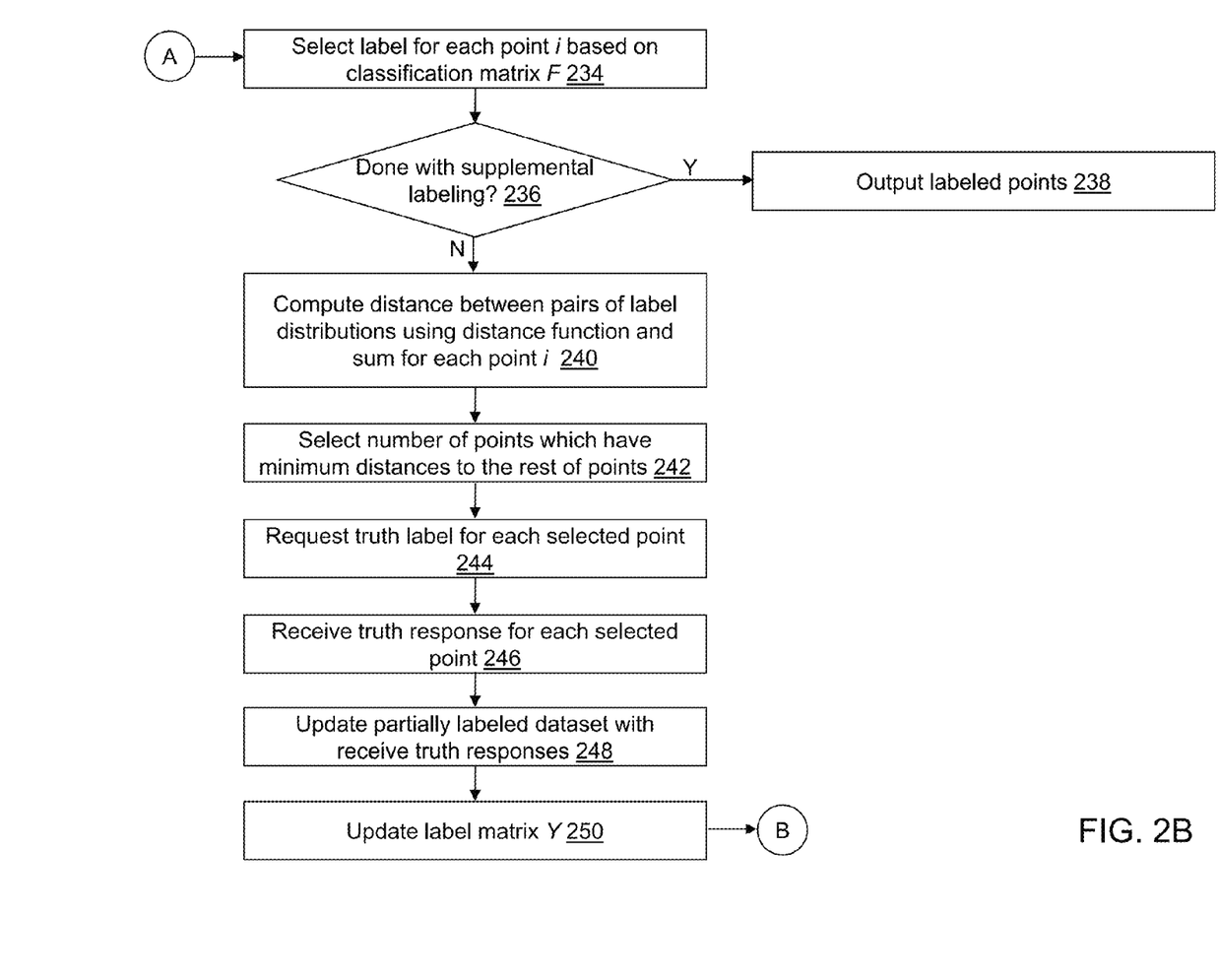
Figure 3A:
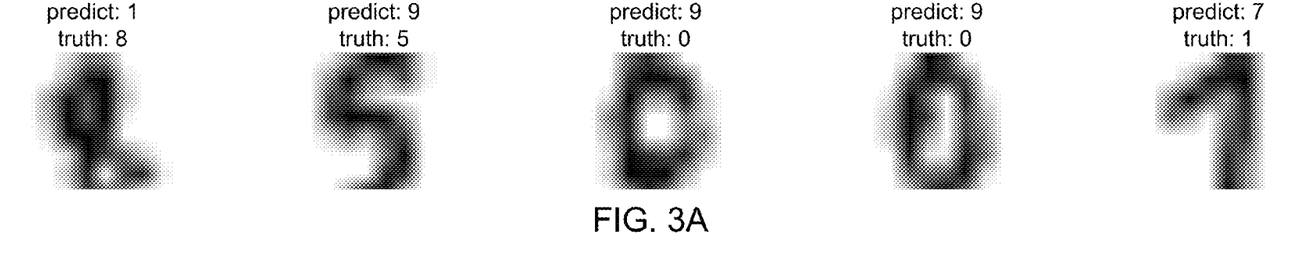
FIGS. 3A-3E depict supplemental points successively selected for labeling by the data labeling device of FIG. 1 in accordance with an illustrative embodiment.
Figure 3B:
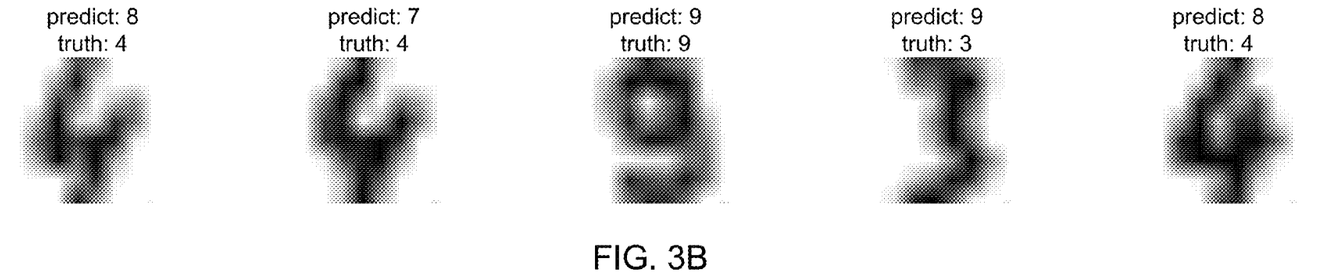
Figure 3C:
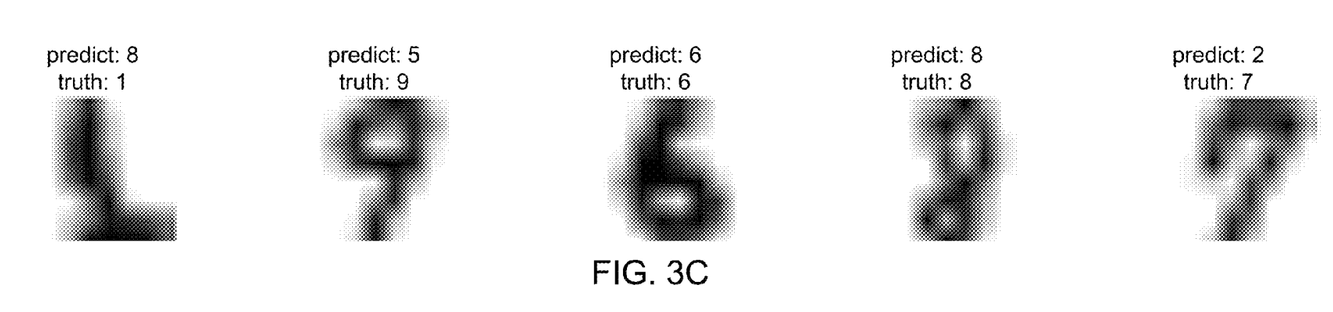
Figure 3D:
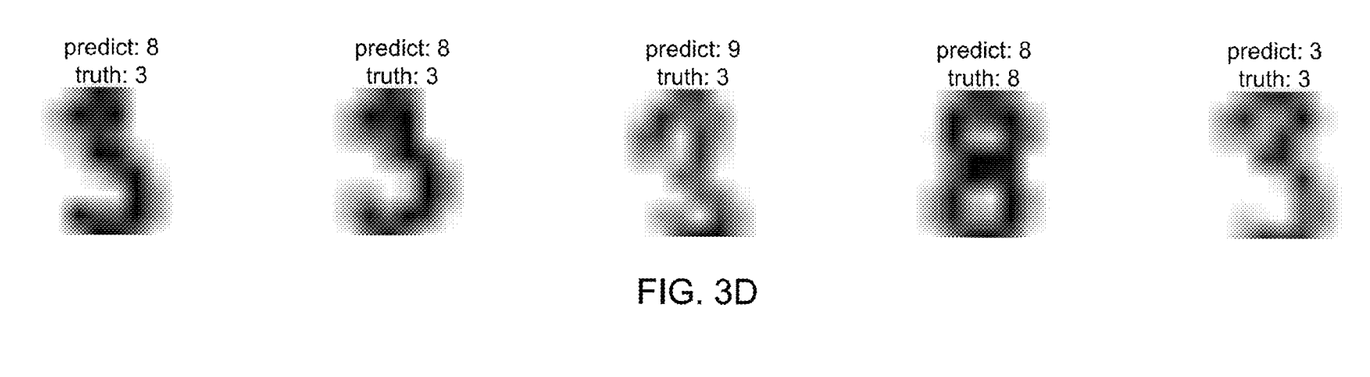
Figure 3E:
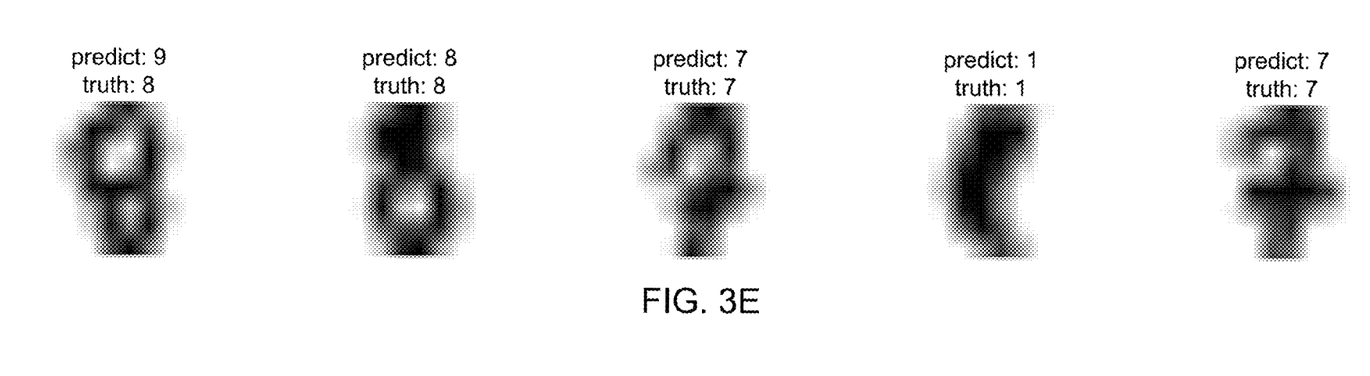

Referring to FIGS. 2A and 2B, example operations associated with data labeling application 122 are described. For example, data labeling application 122 may be used to create labeled dataset 126 from partially labeled dataset 124. On each iteration, additional data points of partially labeled dataset 124 are identified for truth labeling. Data labeling application 122 has been shown to improve the accuracy of labels defined in labeled dataset 126 at much lower cost due to a reduced reliance on human labor.

Additional, fewer, or different operations may be performed depending on the embodiment of data labeling application 122. The order of presentation of the operations of FIGS. 2A and 2B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute data labeling application 122, which causes presentation of a first user interface window, which may include a plurality of menus and selectors such as drop down menus, buttons, text boxes, hyperlinks, etc. associated with data labeling application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by data labeling application 122.

Referring to FIG. 2A, in an operation 200, a first indicator may be received that indicates partially labeled dataset 124. For example, the first indicator indicates a location and a name of partially labeled dataset 124. As an example, the first indicator may be received by data labeling application 122 after selection from a user interface window or after entry by a user into a user interface window. In an alternative embodiment, partially labeled dataset 124 may not be selectable. For example, a most recently created dataset may be used automatically. A subset of the observation vectors $x_i$ included in partially labeled dataset 124 are labeled.

In an operation 202, a second indicator may be received that indicates a label set Q associated with partially labeled dataset 124. For example, the label set Q includes a list of permissible values that the $y_i$-variable (target) value of each observation vector $x_i$ may have. For illustration, if partially labeled dataset 124 includes text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". No $y_i$-variable (target) value indicates that the associated observation vector $x_i$ is not labeled in partially labeled dataset 124. In an alternative embodiment, a $y_i$-variable (target) value, for example, of zero may indicate that the associated observation vector $x_i$ is not labeled in partially labeled dataset 124 where the value of zero is not included in the label set Q. Thus, partially labeled dataset 124 defines a point set $x=\{x_1, \ldots, x_j, x_{j+1}, \ldots, x_n\}$, where n indicates a number of data points or observation vectors $x_i$ included in partially labeled dataset 124, where the observation vectors $x_i$ (i≤l) are labeled as $y_i \in Q$, and the remaining observation vectors $x_i$ (l<i≤n) are unlabeled (not labeled as $y_i \in Q$). Thus, l indicates a number of labeled data points or observation vectors $x_i$ included in partially labeled dataset 124. For illustration, l may be a small percentage, such as less than 1% of the observation vectors $x_i$ included in partially labeled dataset 124. Partially labeled dataset 124 includes an observation vector $x_i$ where i=1, . . . , n.

Data labeling application 122 determines a label from label set Q for each observation vector $x_i$ included in partially labeled dataset 124 that is not labeled. The resulting fully labeled (supervised) data is stored in labeled dataset 126.

In an operation 204, a third indicator may be received that indicates a relative weighting value α, where α is selected between zero and one, non-inclusive. As described further below, each data point receives information from its neighboring data points while also retaining its initial label information. The relative weighting value α specifies a relative amount of the information from its neighbors versus its initial label information. The relative weighting value α=0.5 indicates equal weight between the information from its neighbors relative to its initial label information.

In an operation 206, a fourth indicator of a kernel function to apply may be received. For example, the fourth indicator indicates a name of a kernel function. The fourth indicator may be received by data labeling application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in data labeling application 122. For example, the Gaussian kernel function may be used by default or without allowing a selection. The Gaussian kernel function may be defined as:

$$\exp \frac{-\|x_i - x_j\|^2}{2s^2} \quad (1)$$

where s is a kernel parameter that is termed a Gaussian bandwidth parameter.

In an operation 208, a fifth indicator of a kernel parameter value to use with the kernel function may be received. For example, a value for s, the Gaussian bandwidth parameter, may be received for the Gaussian kernel function. In an alternative embodiment, the fifth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 210, a sixth indicator of a labeling convergence test may be received. For example, the sixth indicator indicates a name of a labeling convergence test. The sixth indicator may be received by data labeling application 122 after selection from a user interface window or after entry by a user into a user interface window. A default value for the labeling convergence test may further be stored, for example, in computer-readable medium 108. As an example, a labeling convergence test may be selected from "Num Iterations", "Within Tolerance", etc. For example, a default convergence test may be "Num Iterations". Of course, the labeling convergence test may be labeled or selected in a variety of different manners by the user as understood by a person of skill in the art. In an alternative embodiment, the labeling convergence test may not be selectable, and a single labeling convergence test is implemented by data labeling application 122. For example, the labeling convergence test "Num Iterations" may be used by default or without allowing a selection.

In an operation 212, a seventh indicator of a labeling convergence test value may be received. In an alternative embodiment, the seventh indicator may not be received. For example, a default value may be stored, for example, in computer-readable medium 108 and used automatically when the seventh indicator is not received. In an alternative embodiment, the labeling convergence test value may not be selectable. Instead, a fixed, predefined value may be used. As an example, when the labeling convergence test "Num Iterations" is indicated from operation 210, the labeling convergence test value is a number of iterations $M_L$. Merely for illustration, the number of iterations $M_L$ may be set between 10 and 1000 though the user may determine that other values are more suitable for their application as understood by a person of skill in the art, for example, based on the labeling accuracy desired, computing resources available, size of partially labeled dataset 124, etc. As another example, when the labeling convergence test "Within Tolerance" is indicated from operation 210, the labeling convergence test value may be a tolerance value $\tau$.

In an operation 214, an eighth indicator of a distance function may be received. For example, the eighth indicator indicates a name of a distance function. The eighth indicator may be received by data labeling application 122 after selection from a user interface window or after entry by a user into a user interface window. A default value for the distance function may further be stored, for example, in computer-readable medium 108. As an example, a distance function may be selected from "Kullback-Leibler", "Euclidian", "Manhattan", "Minkowski", "Cosine", "ChebysheV", "Hamming", "Mahalanobis", etc. As an example, a default distance function may be "Kullback-Leibler". Of course, the distance function may be labeled or selected in a variety of different manners by the user as understood by a person of skill in the art. In an alternative embodiment, the distance function may not be selectable, and a single distance function is implemented by data labeling application 122.

In an operation 216, a ninth indicator of a number of supplemental labeled points $N_{SL}$ may be received. In an alternative embodiment, the ninth indicator may not be received. For example, a default value may be stored, for example, in computer-readable medium 108 and used automatically. In another alternative embodiment, the value of the number of supplemental labeled points $N_{SL}$ may not be selectable. Instead, a fixed, predefined value may be used. The number of supplemental labeled points $N_{SL}$ defines a number of additional data points of partially labeled dataset 124 that are identified for truth labeling on each iteration as described further below. Merely for illustration, the number of supplemental labeled points $N_{SL}$ may be between 2 and 10 though the user may determine that other values are more suitable for their application.

In an operation 217, a tenth indicator of a number of times $M_{SL}$ to perform supplemental labeling may be received. In an alternative embodiment, the tenth indicator may not be received. For example, a default value may be stored, for example, in computer-readable medium 108 and used automatically when the tenth indicator is not received. In an alternative embodiment, the number of times may not be selectable. Instead, a fixed, predefined value may be used. Merely for illustration, the number of times $M_{SL}$ may be set between 3 and 1000 though the user may determine that other values are more suitable for their application as understood by a person of skill in the art, for example, based on computing resources available, size of partially labeled dataset 124, etc.

In an operation 218, an affinity matrix W is computed based on the kernel function indicated by operation 206 and the kernel parameter value indicated by operation 208. For example, using the Gaussian kernel function, the affinity matrix W is defined as $$W_{ij} = \exp\frac{-\|x_i - x_j\|^2}{2s^2}$$

if i≠j and $W_{ii}$=0 for, where s is the kernel parameter value and the affinity matrix W is an n×n matrix such that i=1, . . . , n and j=1, . . . , n.

In an operation 220, a diagonal matrix D is computed based on the affinity matrix W. For example, using the Gaussian kernel function, the diagonal matrix D is an n×n matrix and is defined as $D_{ii}=\Sigma_{j=1}^{n} W_{ij}$ and $D_{ij}$=0 if i≠j.

In an operation 222, a normalized distance matrix S is computed based on the affinity matrix W and the diagonal matrix D. For example, the normalized distance matrix S is an n×n matrix and is defined as $S=D^{-1/2}WD^{-1/2}$.

In an operation 224, a label matrix Y is defined based on partially labeled dataset 124. Label matrix Y is an n×c matrix with $Y_{ik}$=1 if $x_i$ is labeled as $y_i$=k. Otherwise, $Y_{ik}$=0, where k=1, . . . , c.

In an operation 226, a classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test indicated from operation 210. As an example, when the labeling convergence test "Num Iterations" is indicated from operation 210, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$. As another example, when the labeling convergence test "Within Tolerance" is indicated from operation 210, a first labeling convergence parameter value $\Delta F$ may be initialized to a large number and associated with the tolerance value $\tau$.

In an operation 228, an updated classification matrix F(t+1) is computed using F(t+1)=αSF(t)+(1−α)Y, where for a first iteration of operation 228, F(t)=F(0). The updated classification matrix F defines a label probability for each permissible value defined in label set Q for each observation vector $x_i$.

in an operation 230, the one or more labeling convergence parameter values are updated. As an example, when the labeling convergence test "Num Iterations" is indicated from operation 210, t=t+1. As another example, when the labeling convergence test "Within Tolerance" is indicated from operation 210, $\Delta F=F(t+1)-F(t)$.

In an operation 232, a determination is made concerning whether or not labeling has converged by evaluating the labeling convergence test. When labeling has converged, processing continues in an operation 234. When labeling has not converged, processing continues in operation 228 to compute a next update of classification matrix F(t+1). As an example, when the labeling convergence test "Num Iterations" is indicated from operation 210, the first labeling convergence parameter value t is compared to the labeling convergence test value that is the number of iterations $M_L$. When $t \geq M_L$, labeling has converged. As another example, when the labeling convergence test "Within Tolerance" is indicated from operation 210, the first labeling convergence parameter value ΔF is compared to the labeling convergence test value that is the tolerance value τ. When $\Delta F \leq \tau$, labeling has converged.

Referring to FIG. 2B, In operation 234, the $y_i$-variable (target) value of each observation vector $x_i$ is labeled using F(t). $y_i$ is selected for each observation vector $x_i$ based on $y_i = \text{argmax}_{j \leq c} F_{ij}(t)$.

In an operation 236, a determination is made concerning whether or not supplemental labeling is done. When supplemental labeling is done, processing continues in an operation 238. When supplemental labeling is not done, processing continues in an operation 240. For example, supplemental labeling is done when a number of times operations 240-250 have been performed is greater than or equal to $M_{SL}$.

In operation 238, the $y_i$-variable (target) value of each observation vector $x_i$ selected in operation 234 is output. For example, each observation vector $x_i$ with its selected $y_i$-variable (target) value is stored in labeled dataset 126. Labeled dataset 126 may be stored on data labeling device 100 and/or on one or more computing devices of distributed computing system 128 in a variety of formats as understood by a person of skill in the art. All or a subset of labeled dataset 126 further may be output to display 116, to printer 120, etc. For example, medical images labeled as including a tumor may be recognized by data labeling application 122 and presented on display 116 or indicators of the medical images may be printed on printer 120. As another option, a notification message may be sent to a clinician indicating that a tumor has been identified based on a "tumor" label determined for the image data. In an illustrative embodiment, an alert message may be sent to another device using communication interface 106, printed on printer 120 or another printer, presented visually on display 116 or another display, presented audibly using speaker 118 or another speaker, etc. based on how urgent a response is needed to a certain label. For example, if a sound signal or image data indicate an intrusion into a surveilled area, a notification message may be sent to a responder.

In an operation 240, a distance vector Dis is computed between each pair of observation vectors of the label distributions defined by F(t). As an example, the distance function indicated from operation 214 is used to compute distance vector Dis between each pair of the observation vectors of the label probability distributions defined by F(t). Distance vector Dis is a n×1 vector. For illustration, when the distance function indicated from operation 214 is "Kullback-Leibler" Dis is computed using $$Dis_i = \sum_{j=1}^{n} \sum_{k=1}^{c} F_{kj}(t) \log \frac{F_{kj}(t)}{F_{ki}(t)}, i = 1, \ldots, n, j \neq i.$$

In an operation 242, the number of supplemental labeled points $N_{SL}$, are selected from distance matrix Dis by identifying the $N_{SL}$ data points having the smallest distances in distance matrix Dis. The index i to the observation vector $x_i$ associated with each data point may be identified as part of the selection.

In an operation 244, a truth label is requested for each of the selected $N_{SL}$ data points by presenting the observation vector $x_i$ associated with each data point. For example, if the observation vector $x_i$ includes an image, the image is presented on display 116 with a request that a user determine the truth label, the true $y_i$-variable (target) value, for that observation vector $x_i$. The truth label may represent different values dependent on what the image represents or indicates. As another example, if the observation vector $x_i$ includes a sound signal, the sound signal is played on speaker 118 with a request that a user determine the truth label, the true $y_i$-variable (target) value, for that observation vector $x_i$. The truth label may represent different values dependent on what the sound signal represents or indicates.

In an operation 246, a truth response label, the true $y_i$-variable (target) value for each observation vector $x_i$ of the selected $N_{SL}$ data points, is received. The truth response label includes one of the permissible values included in label set Q.

In an operation 248, the truth response label, the true $y_i$-variable (target) value for each observation vector $x_i$ of the selected $N_{SL}$ data points, is updated in partially labeled dataset 124. As a result, l has been increased by $N_{SL}$. Partially labeled dataset 124 may be sorted so that the newly labeled data points are included in point set $\chi = \{x_1, \ldots, x_l, x_{l+1}, \ldots, x_n\}$, where the observation vectors $x_i$ (i≤l) are labeled as $y_i \in Q$, and the remaining observation vectors $x_i$ (l<i≤n) are unlabeled (not labeled as $y_i \in Q$).

In operation 250, label matrix Y is updated based on partially labeled dataset 124 updated in operation 248, and processing continue in operation 226 to reinitialize classification matrix F and update labels in partially labeled dataset 124. Operations 240-250 are performed at least once, and operations 226-234 are performed at least twice before the $y_i$-variable (target) value of each observation vector $x_i$ selected in operation 234 is output in operation 238.

Data labeling application 122 optimizes the process of selecting better labeled data to improve classification/prediction performance. By selecting the labeled data based on a distance measure, data labeling application 122 selects the most informative data since they have the smallest distance to the rest of the data in a probability space. Geometrically, these data are frequently located in the center of clusters in the probability space. By adding them into labeled dataset 124, they can significantly facilitate the learning process in comparison to random selection.

Data labeling application 122 was used with a dataset of handwritten digits as partially labeled dataset 124. Partially labeled dataset 124 included 1500 samples (observation vectors $x_i$) (n=1500), where each sample had 64 dimensions because each handwritten digit included a gray level 8 by 8 pixel image. There were 10 labels (c=10), namely, the handwritten digits from "0" to "9". Partially labeled dataset 124 included 10 labeled samples (l=10). The Gaussian kernel function was used for affinity matrix W with s=0.25. Intuitively, s defines how far the influence of a single training example reaches, with low values meaning 'far' and high values meaning 'close'. The relative weighting value α was set to 0.2, where the larger the weight is, the faster labels propagate. $N_{SL}$, was set to five and the Kullback-Leibler divergence was used for the distance function. $M_L=5$ was used.

The effectiveness of data labeling application 122 can be measured using both quantitative results and qualitative results. For quantitative results, a precision, a recall, and an F1-score were computed for each of the 10 labels. Precision can be defined as $$\text{precision} = \frac{tp}{tp + fp}$$

and recall can be defined as $$\text{recall} = \frac{tp}{tp + fn},$$

where tp is the number of true positives, fp is the number of false positives, and fn is the number of false negatives. F1 can be defined as $$F1 = 2 * \frac{\text{precision} * \text{recall}}{\text{precision} + \text{recall}}.$$

For example, for a text search on a set of documents, precision is the number of correct results divided by the number of all returned results. Recall is the number of correct results divided by the number of results that should have been returned. F1-score is a measure that combines precision, and recall and is a harmonic mean of precision and recall.

For $M_{SL}$=9, data labeling application 122 achieved 94% precision and 93% recall with 50 total labeled samples (five samples having minimum distance in summed distance matrix SD were added to partially labeled dataset 124 at each iteration) and 1450 unlabeled samples.

For qualitative results, the five samples having minimum distance in summed distance matrix SD are shown in FIGS. 3A-3E for a first iteration of operations 240-250, for a second iteration of operations 240-250, for a third iteration of operations 240-250, for a fourth iteration of operations 240-250, and for a fifth iteration of operations 240-250, respectively. "Predict" above each image indicates the label determined in operation 234 for the sample, and "truth" above each image indicates the label received in operation 246 for the sample. Note that the number of correct predictions increases with each iteration.

The performance gains resulting from use of data labeling application 122 can be measured by comparing the precision, recall, and F1-score generated by operations 228-234 versus operations 226-250 using the same number of labeled samples. For example, operations 228-234 were performed with 15 labeled samples and the labeled points output to labeled dataset 126 after operation 234 in operation 238 without performing operations 240-250. In comparison, operations 228-234 were performed with 10 initially labeled samples and operations 226-234 were performed with five supplemental samples selected in operation 242 for one or more additional iterations. Table I below shows the precision results:

TABLE I

| Number of labeled samples | operations 228-234 | operations 226-250 |
|---|---|---|
| 15 labels (10 initial, $M_{SL}$ = 1, 1 iteration of operations 240-250) | 0.47 | 0.73 |
| 20 labels (10 initial, $M_{SL}$ = 2, 2 iterations of operations 240-250) | 0.61 | 0.90 |
| 25 labels (10 initial, $M_{SL}$ = 3, 3 iterations of operations 240-250) | 0.76 | 0.92 |
| 30 labels (10 initial, $M_{SL}$ = 4, 4 iterations of operations 240-250) | 0.76 | 0.93 |

Table II below shows the recall results:

TABLE II

| Number of labeled samples | operations 228-234 | operations 226-250 |
|---|---|---|
| 15 labels (10 initial, $M_{SL}$ = 1, 1 iteration of operations 240-250) | 0.59 | 0.79 |
| 20 labels (10 initial, $M_{SL}$ = 2, 2 iterations of operations 240-250) | 0.73 | 0.88 |
| 25 labels (10 initial, $M_{SL}$ = 3, 3 iterations of operations 240-250) | 0.81 | 0.89 |
| 30 labels (10 initial, $M_{SL}$ = 4, 4 iterations of operations 240-250) | 0.83 | 0.91 |

Table III below shows the F1-score results:

TABLE III

| Number of labeled samples | operations 228-234 | operations 226-250 |
|---|---|---|
| 15 labels (10 initial, $M_{SL}$ = 1, 1 iteration of operations 240-250) | 0.49 | 0.76 |
| 20 labels (10 initial, $M_{SL}$ = 2, 2 iterations of operations 240-250) | 0.66 | 0.89 |
| 25 labels (10 initial, $M_{SL}$ = 3, 3 iterations of operations 240-250) | 0.77 | 0.90 |
| 30 labels (10 initial, $M_{SL}$ = 4, 4 iterations of operations 240-250) | 0.79 | 0.91 |

The precision, recall, and F1-score values demonstrate that data labeling application 122 achieves better classification results in terms of the ability to correctly label an item with fewer incorrect labels over prior algorithms that label unlabeled data using a fixed number of randomly selected observation vectors $x_i$. For example, the improvement may be attributable to the selection of supplemental labels that have minimum average distances and, as a result, are more informative.

Data labeling application 122 can be implemented as part of a machine learning application. Data labeling application 122 lowers the cost associated with training the object labeling process because fewer samples are needed to be labeled due to the identification of the samples that are most informative.

Data labeling application 122 can be used for image recognition on the Internet. For example, the target is to identify whether an image is or is not an image of a cat based on a limited time and resource budget. The labeling task is usually accomplished by volunteers. Using data labeling application 122, the best set for the training data (images with a cat or images with a cat) is identified.

Data labeling application 122 can be used for image recognition in sports analysis to recognize human actions such as diving, walking, running, swinging, kicking, lifting, etc. Image recognition in this area is a challenging task due to significant intra-class variations, occlusion, and background cluster for big data. Most of the existing work uses action models based on statistical learning algorithms for classification. To obtain ideal recognition results, a massive amount of the labeled samples are required to train the complicated human action models. However, collecting labeled samples is very costly. Data labeling application 122 addresses this challenging by selecting the most informative labeled human action samples using a smaller budget while providing better classification results.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors;

read a label set, wherein the label set defines permissible values for a target variable, wherein a value of the permissible values of the target variable is defined for a subset of the plurality of observation vectors;

compute an affinity matrix using a kernel function and the plurality of observation vectors;

compute a diagonal matrix by summing each row of the computed affinity matrix, wherein the sum of each row is stored in a diagonal of the row with zeroes in remaining positions of the row;

compute a normalized distance matrix using the computed affinity matrix and the computed diagonal matrix;

define a label matrix using the value of the target variable of each observation vector of the plurality of observation vectors (a) initialize a classification matrix as the defined label matrix;

(b) compute a converged classification matrix, wherein the converged classification matrix defines a label probability for each permissible value defined in the label set for each observation vector of the plurality of observation vectors, wherein the classification matrix is converged using $F(t+1)=\alpha SF(t)+(1-\alpha)Y$, where $F(t+1)$ is a next classification matrix, $\alpha$ is a relative weighting value, S is the normalized distance matrix defined as $S=D^{-1/2}WD^{-1/2}$, where W is the computed affinity matrix and D is the computed diagonal matrix, $F(t)$ is the classification matrix, Y is the label matrix defined as $Y_{ik}=1$ if $x_i$ is labeled as $y_i=k$; otherwise, $Y_{ik}=0$, where $x_i$ is an observation vector of the plurality of observation vectors, $i=1, \ldots, n$, n is a number of vectors of the plurality of observation vectors, $k=1, \ldots, c$, and c is a number of permissible values of the label set, and t is an iteration number, wherein the classification matrix is converged when a second predefined number of iterations of computations of $F(t+1)=\alpha SF(t)+(1-\alpha)Y$ is complete;

(c) for each observation vector, update the value of the target variable based on a maximum label probability value identified from the converged classification matrix;

a predefined number of times, compute a distance vector that defines a distance value between each pair of the plurality of observation vectors using a distance function applied to only the converged classification matrix;

select a number of observation vectors from the dataset that have minimum values for the distance value;

request that a user provide a label for each of the selected observation vectors;

receive a response to the request from the user for each of the selected observation vectors;

update the value of the target variable for each of the selected observation vectors with the received response; and repeat operations (a) to (c); and after the predefined number of times, output the value of the target variable for each observation vector of the plurality of observation vectors to a second dataset.

2. The non-transitory computer-readable medium of claim 1, wherein each observation vector defines an image, and the value of the target variable defines an image label determined using the converged classification matrix or the received response.

3. The non-transitory computer-readable medium of claim 1, wherein the subset of the plurality of observation vectors is less than one percent of the plurality of observation vectors.

4. The non-transitory computer-readable medium of claim 1, wherein the distance function is based on a Kullback-Leibler divergence computation.

5. The non-transitory computer-readable medium of claim 4, wherein the distance vector is computed using $$Dis_i = \sum_{j=1}^{n}\sum_{k=1}^{c} F_{kj}(t)\log\frac{F_{kj}(t)}{F_{ki}(t)}, i \neq j.$$

6. The non-transitory computer-readable medium of claim 1, wherein the kernel function is a Gaussian kernel function.

7. The non-transitory computer-readable medium of claim 6, wherein the affinity matrix is defined as $$W_{ij} = \exp\frac{-\|x_i - x_j\|^2}{2s^2}$$

if $i \neq j$ and $W_{ii}=0$, where s is a Gaussian bandwidth parameter and $j=1, \ldots, n$.

8. The non-transitory computer-readable medium of claim 1, wherein the diagonal matrix is defined as $D_{ii}=\Sigma_{j=1}^{n} W_{ij}$ and $D_{ij}=0$ if $i \neq j$.

9. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors;
read a label set, wherein the label set defines permissible values for a target variable, wherein a value of the permissible values of the target variable is defined for a subset of the plurality of observation vectors;
compute an affinity matrix using a kernel function and the plurality of observation vectors;
compute a diagonal matrix by summing each row of the computed affinity matrix, wherein the sum of each row is stored in a diagonal of the row with zeroes in remaining positions of the row;
compute a normalized distance matrix using the computed affinity matrix and the computed diagonal matrix;
define a label matrix using the value of the target variable of each observation vector of the plurality of observation vectors
(a) initialize a classification matrix as the defined label matrix;
(b) compute a converged classification matrix, wherein the converged classification matrix defines a label probability for each permissible value defined in the label set for each observation vector of the plurality of observation vectors, wherein the classification matrix is converged using $F(t+1)=\alpha SF(t)+(1-\alpha)Y$, where $F(t+1)$ is a next classification matrix, $\alpha$ is a relative weighting value, S is the normalized distance matrix defined as $S=D^{-1/2}WD^{-1/2}$, where W is the computed affinity matrix and D is the computed diagonal matrix, $F(t)$ is the classification matrix, Y is the label matrix defined as $Y_{ik}=1$ if $x_i$ is labeled as $y_i=k$; otherwise, $Y_{ik}=0$, where $x_i$ is an observation vector of the plurality of observation vectors, $i=1, \ldots, n$, n is a number of vectors of the plurality of observation vectors, $k=1, \ldots, c$, and c is a number of permissible values of the label set, and t is an iteration number, wherein the classification matrix is converged when a second predefined number of iterations of computations of $F(t+1)=\alpha SF(t)+(1-\alpha)Y$ is complete;
(c) for each observation vector, update the value of the target variable based on a maximum label probability value identified from the converged classification matrix;
a predefined number of times,
compute a distance vector that defines a distance value between each pair of the plurality of observation vectors using a distance function applied to only the converged classification matrix;
select a number of observation vectors from the dataset that have minimum values for the distance value;
request that a user provide a label for each of the selected observation vectors;
receive a response to the request from the user for each of the selected observation vectors;
update the value of the target variable for each of the selected observation vectors with the received response; and
repeat operations (a) to (c); and
after the predefined number of times, output the value of the target variable for each observation vector of the plurality of observation vectors to a second dataset.

10. The computing device of claim 9, wherein the distance vector is computed using $$Dis_i = \sum_{j=1}^{n}\sum_{k=1}^{c} F_{kj}(t)\log\frac{F_{kj}(t)}{F_{ki}(t)}, i \neq j.$$

11. The computing device of claim 9, wherein the diagonal matrix is defined as $D_{ii}=\Sigma_{j=1}^{n} W_{ij}$ and $D_{ij}=0$ if $i \neq j$.

12. A method of predicting occurrence of an event or classifying an object using semi-supervised data to label unlabeled data in a dataset, the method comprising:
reading, by a computing device, a dataset that includes a plurality of observation vectors;
reading, by the computing device, a label set, wherein the label set defines permissible values for a target variable, wherein a value of the permissible values of the target variable is defined for a subset of the plurality of observation vectors;
computing, by the computing device, an affinity matrix using a kernel function and the plurality of observation vectors;
computing, by the computing device, a diagonal matrix by summing each row of the computed affinity matrix, wherein the sum of each row is stored in a diagonal of the row with zeroes in remaining positions of the row;
computing, by the computing device, a normalized distance matrix using the computed affinity matrix and the computed diagonal matrix;
defining, by the computing device, a label matrix using the value of the target variable of each observation vector of the plurality of observation vectors
(a) initializing, by the computing device, a classification matrix as the defined label matrix;
(b) computing, by the computing device, a converged classification matrix, wherein the converged classification matrix defines a label probability for each permissible value defined in the label set for each observation vector of the plurality of observation vectors, wherein the classification matrix is converged using $F(t+1)=\alpha SF(t)+(1-\alpha)Y$, where $F(t+1)$ is a next classification matrix, $\alpha$ is a relative weighting value, S is the normalized distance matrix defined as $S=D^{-1/2}WD^{-1/2}$, where W is the computed affinity matrix and D is the computed diagonal matrix, $F(t)$ is the classification matrix, Y is the label matrix defined as $Y_{ik}=1$ if $x_i$ is labeled as $y_i=k$; otherwise, $Y_{ik}=0$, where $x_i$ is an observation vector of the plurality of observation vectors, $i=1, \ldots, n$, n is a number of vectors of the plurality of observation vectors, $k=1, \ldots, c$, and c is a number of permissible values of the label set, and t is an iteration number, wherein the classification matrix is converged when a second predefined number of iterations of computations of $F(t+1)=\alpha SF(t)+(1-\alpha)Y$ is complete;

(c) for each observation vector, updating, by the computing device, the value of the target variable based on a maximum label probability value identified from the converged classification matrix;

a predefined number of times, computing, by the computing device, a distance vector that defines a distance value between each pair of the plurality of observation vectors using a distance function applied to only the converged classification matrix;

selecting, by the computing device, a number of observation vectors from the dataset that have minimum values for the distance value;

requesting, by the computing device, that a user provide a label for each of the selected observation vectors;

receiving, by the computing device, a response to the request from the user for each of the selected observation vectors;

updating, by the computing device, the value of the target variable for each of the selected observation vectors with the received response; and repeating, by the computing device, operations (a) to (c); and after the predefined number of times, outputting, by the computing device, the value of the target variable for each observation vector of the plurality of observation vectors to a second dataset.

13. The method of claim 12, wherein the distance vector is computed using $Dis_i=\Sigma_{j=1}^n \Sigma_{k=1}^c F_{kj}(t)\log F_{kj}(t)/F_{ki}(t)$, $i \neq j$.

14. The method of claim 12, wherein the affinity matrix is defined as $$W_{ij} = \exp\frac{-\|x_i - x_j\|^2}{2s^2}$$

if $i \neq j$ and $W_{ii}=0$, where s is a Gaussian bandwidth parameter and $j=1, \ldots, n$.

15. The method of claim 12, wherein the diagonal matrix is defined as $D_{ii}=\Sigma_{j=1}^n W_{ij}$ and $D_{ij}=0$ if $i \neq j$.

* * * * *

UNITED STATES PATENT AND TRADEMARK OFFICE
CERTIFICATE OF CORRECTION

PATENT NO.        : 9,792,562 B1
APPLICATION NO.   : 15/335530
DATED             : October 17, 2017
INVENTOR(S)       : Xu Chen et al.

It is certified that error appears in the above-identified patent and that said Letters Patent is hereby corrected as shown below:

In the Specification

Column 7, Lines 61-62:
Delete "x = {x$_1$, ... , x$_l$, x$_{l+1}$, ... , x$_n$}" and replace with --$\chi$ = {$x_1$, ... , $x_l$, $x_{l+1}$, ... , $x_n$}--

Column 10, Line 22:
Delete "if i ≠ j and W$_{ii}$ = 0 for," and replace with --if $i \neq j$ and $W_{ii}$ = 0,--

Signed and Sealed this
Eighth Day of May, 2018

Andrei Iancu
*Director of the United States Patent and Trademark Office*